Patented Apr. 14, 1925.

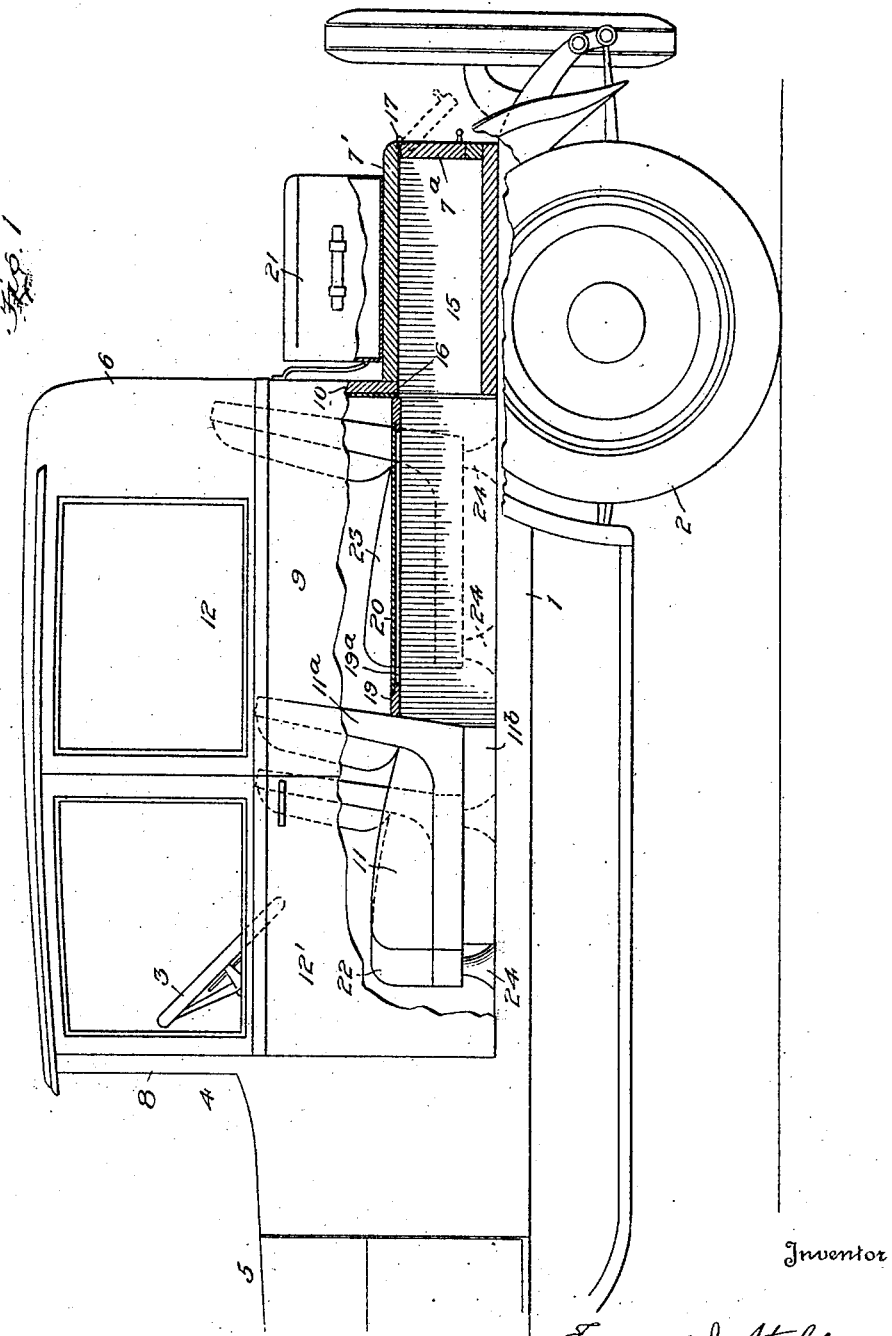

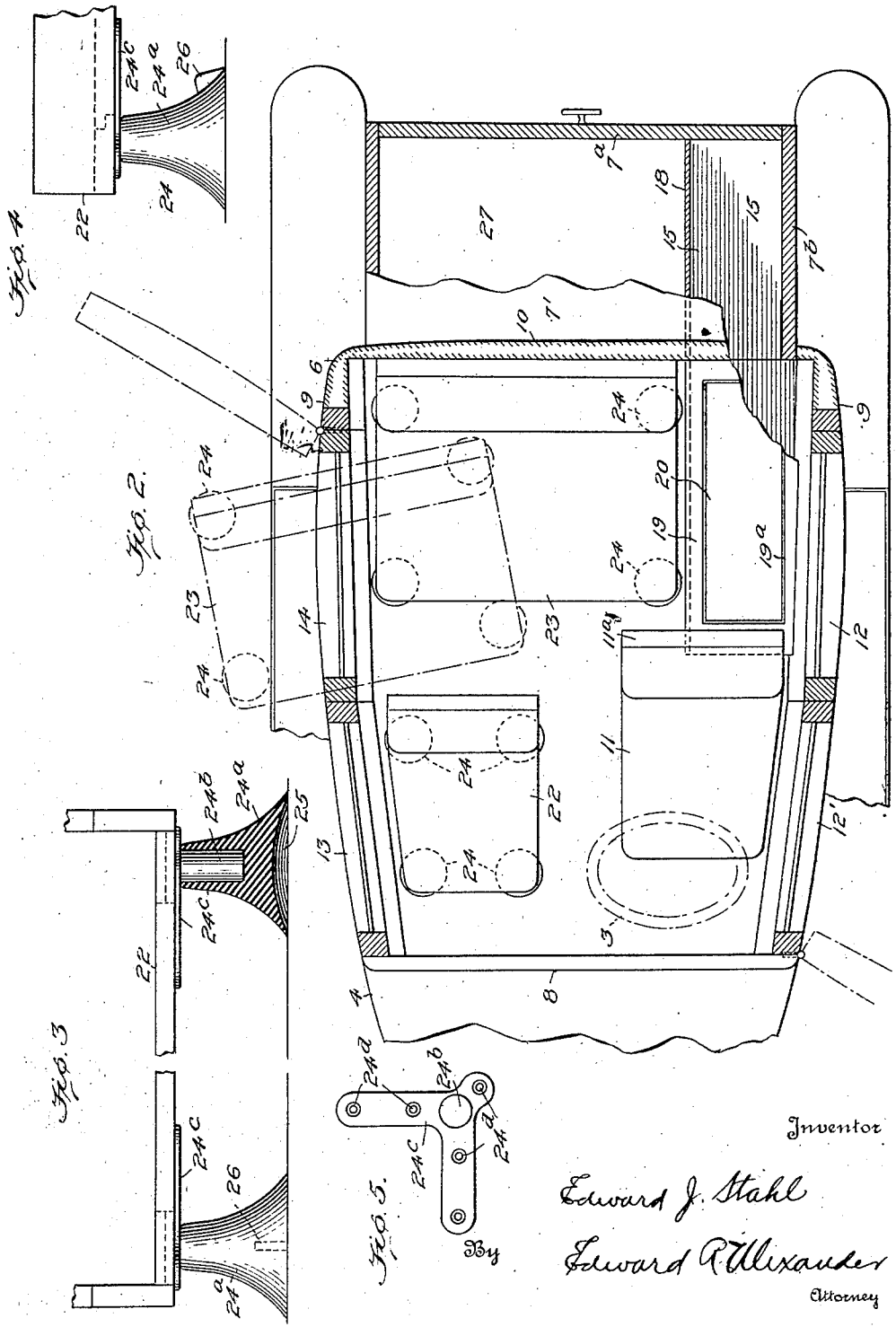

1,533,354

UNITED STATES PATENT OFFICE.

EDWARD J. STAHL, OF CLEVELAND, OHIO, ASSIGNOR TO THE BAKER R. & L. COMPANY, OF CLEVELAND, OHIO, A CORPORATION OF OHIO.

VEHICLE BODY.

Application filed April 25, 1923. Serial No. 634,578.

*To all whom it may concern:*

Be it known that I, EDWARD J. STAHL, a citizen of the United States, residing at Cleveland, in the county of Cuyahoga and State of Ohio, have invented certain new and useful Improvements in and Relating to Vehicle Bodies, of which the following is a specification.

This invention relates to a motor vehicle, more particularly to the vehicle body. The invention is shown, by way of example, as embodied in a closed vehicle, altho it may be embodied in other types or constructions of vehicle bodies.

The object of the invention is to construct a vehicle body having a plurality of compartments so arranged and incorporated in the body construction that longer articles and relatively larger sized articles, utensils and implements of use may be stored away while maintaining standards in size or design of the body.

Another object of the invention is to construct an improved vehicle body having a compartment extending from its rear end inwardly beyond the main portion of the vehicle, whereby relatively long articles of use may be readily stored and removed, and access of the compartment may be had from the exterior or interior of the vehicle.

Another object of the invention is to construct a vehicle body having a hollow tail portion open on its rear side and provided with a deck to support a removable container, whereby increased storing and carrying capacity is provided.

A further object of the invention is to construct a vehicle body in which certain of the seats may be moved relative to each other to suit the convenience of the occupants or shifted or removed to utilize the interior of the body to the best advantage to receive and carry loads, thereby adapting the body for carrying passengers or materials to be transported.

Another object of the invention is to provide a vehicle in which the body and seats therein are constructed to provide maximum storing space and carrying capacity for passengers or freight or both.

Other objects of the invention will be apparent to those skilled in the art to which my invention relates from the following description taken in connection with the accompanying drawings, wherein—

Fig. 1 is a fragmentary side view of a vehicle, partly in section, embodying my invention.

Fig. 2 is a horizontal sectional view.

Fig. 3 is a fragmentary view, partly in elevation and partly in section, of a pair of legs for one of the seats.

Fig. 4 is a fragmentary elevational view of one of the seats and a leg therefor.

Fig. 5 is a bottom plan view of one of the bracket plates for a seat leg.

In the drawings, 1 indicates a suitable frame mounted on wheels 2, only one of which is shown. The vehicle is self propelled, being driven by any suitable means (not shown), and controlled by suitable devices including a steering wheel 3.

4 indicates a body suitably mounted on the frame 1. The body 4 comprises a hood 5, a main portion 6 for the driver and one or more occupants and a rear or tail section 7 having a deck 7'. The main body portion 6 is preferably of the enclosed type, for example, a coupé, having a wind-shield support 8, sides 9 and a rear wall 10. That side 9 adjacent to the driver's seat 11 is provided with a window 12 and a door 12', the latter being so arranged relative to the driver's seat that the driver may enter the body and make exit therefrom through the door. The opposite side 9 of the body is preferably provided with front and rear doors 13, 14, respectively, which insure ready access to either portion of the vehicle body, as well as for loading it with materials and unloading them therefrom. The doors 12', 13 and 14 are suitably hinged to the frame members of the body.

15 indicates a compartment extending from the rear end of the body inwardly into the main portion 6 of the body, preferably terminating at the rear of the driver's seat 11 and adapted to receive relatively long bodies, utensils and implements of use, such as golf sticks. To incorporate the compartment into the body construction the rear wall 10 is cut away as shown at 16 (Fig. 1). To provide access to the compartment 15 from the outside, one wall of the tail portion is hinged. As I prefer to use the top wall of such portion, as will later be set forth, I hinge the rear wall 7ª, as shown at 17, thereby providing an opening into the rear end of the compartment 15. The compartment 15 is formed by a longitudinally disposed wall 18 extending from the rear wall or door 7ª to the rear side of the driver's seat, thereby utilizing the back 11ª of the driver's seat 11 and its base 11ᵇ as the front wall of the compartment, the wall 18, adjacent body side 9 and side 7ᵇ of the tail portion 7 as the sides of the compartment, and the deck 7' and a frame 19 as the top of the compartment. The frame 19 is preferably arranged in substantially the same plane as the deck 7', being secured to the back 11ª, walls 10 and 18 in any desired manner.

In the tail portion 7 of the body, the wall 18 extends up to the inner surface of the deck 7', but within the main portion 6, it may extend upwardly beyond this plane, if desired. The frame 19 is formed with an opening 19ª to permit access to the compartment 15 from the interior of the main body portion. The opening 19ª is provided with a cover 20.

The deck 7' is preferably disposed in a horizontal plane so as to support a suitable container 21. The container 21 may comprise a trunk or be otherwise shaped and constructed. The container 21 may be removably secured in position on the deck 7' in any desired manner.

22, 23, indicate front and rear seats respectively, for the vehicle, each having legs 24 removably engaging the floor of the body so that it may be shifted thereon or readily removed. The rear seat is of a size and shape to set against the rear wall 10 and between the inner side wall 18 of the compartment 15 and the remote vehicle side 9. As shown each seat 22, 23, comprises a base portion and a back, so that when the seat is moved the back is moved with the base or seat portion. The front seat 22 is preferably of a size to permit movement of the occupants between it and the driver's seat 11, as well as its shifting or reversal on the floor of the body. Each leg 24 for each seat comprises a yieldable member 24ª, a depending rod 24ᵇ fitting a recess in the upper end of the yieldable member 24ª, and a bracket plate 24ᶜ to which the depending rod 24ᵇ is secured in any desired manner. The bracket plate 24ᶜ may be secured to the under side of the seat by suitable screws, passing through openings 24ᵈ—see Fig. 5.

The yieldable member 24ª is formed of soft rubber and its bottom surface is of concave shape to form a chamber 25 adapted to be sealed around the lower peripheral edge of the member. Accordingly, by compressing the yieldable member 24ª and forcing the air out of the chamber 25, a vacuum will be formed therein upon the release of the pressure. As a result of this vacuum effect, the peripheral edges of the member will be secured to the body floor and thus prevent movement of the seat thereon. This form of construction provides in a simple manner for the securing of the seats 22, 23, to the floor without providing the latter with any kind of attaching devices. To remove or detach the legs 24 from the floor, I provide each yieldable member 24ª with a device, for example, an integrally formed lug 26, which may be gripped and pulled upwardly; such pull will flex the adjacent side wall of the yieldable member, allowing air to pass below the lower edge of the flexed portion into the chamber 25 and hence overcome the vacuum effect.

The yieldable members are preferably flared at their lower ends to provide a relatively large peripheral floor engaging edge as well as to provide thin walls near such edge to permit easy flexing of the rubber in effecting the engagement of the member with the floor or its disengagement therefrom.

By making the seats 22, 23, removable, as shown in dotted lines in Fig. 2, I may readily adapt the vehicle to the carrying of materials or articles, thereby utilizing to the maximum the space in the main portion 6 of the vehicle. By shifting the seats 22, 23, or either thereof, the space within the body portion may be utilized to advantage when articles as well as passengers are to be transported. As the vehicle body is provided with front and rear doors, either seat can be removed independently of the other seat and without shifting or removing it.

It will be noted that the tail portion 7 of the body is hollow so that there is provided therein, at one side of the compartment 15, a carrying compartment 27, to which access is had by the door 7ª, the latter being preferably common to both compartments 15 and 27.

It will also be noted that the compartment 15 is disposed on the same side of the body as the driver's seat 11 and occupies the space rearward thereof, thereby utilizing space in the body which cannot be readily used by the occupants and also permitting the storing of relatively long articles for transporting.

To those skilled in the art to which this invention relates, many alterations in construction and widely differing embodiments and applications of my invention will suggest themselves without departing from the spirit and scope thereof. My disclosures and the description herein are purely illustrative and are not intended to be in any sense limiting.

What I claim is:

1. In a vehicle, the combination of a main body portion, a tail portion, and a compartment extending from the rear end of the tail portion inwardly into the main body portion, said compartment having openings leading thereinto from the exterior and interior of said main body portion.

2. In a vehicle, the combination of a main body portion, a driver's seat therein, a tail portion, one wall of which is movable to permit access to said tail portion, a wall extending from the rear wall of said tail portion to the back of said driver's seat and cooperating therewith and the adjacent sides of the body and tail portions to form a longitudinally extending compartment, and a top for that portion of the compartment within the main body portion, said top being formed with an opening to permit access to the compartment from within the main body portion.

3. In a vehicle, the combination of a main body portion, a driver's seat fixed therein, front and rear seats for passengers adjustably and removably engaging the floor, a tail portion, and a compartment extending from the back of said driver's seat to the rear end of said tail portion between said rear seat when in normal position and the adjacent side of the body portion.

In testimony whereof, I have hereunto signed my name.

EDWARD J. STAHL.